(12) United States Patent
Immidi et al.

(10) Patent No.: US 10,616,111 B1
(45) Date of Patent: Apr. 7, 2020

(54) CONSISTENT HASHING FOR PACKETS ACROSS MULTI-STAGE LOOKUPS

(71) Applicant: Arista Networks, Inc., Santa Clara, CA (US)

(72) Inventors: Kiran Kumar Immidi, Santa Clara, CA (US); Sebastiano Borgione, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/409,398

(22) Filed: Jan. 18, 2017

(51) Int. Cl.
*H04L 12/26* (2006.01)
*H04L 12/743* (2013.01)
*H04L 12/709* (2013.01)
*H04L 12/733* (2013.01)

(52) U.S. Cl.
CPC ........ *H04L 45/7453* (2013.01); *H04L 45/122* (2013.01); *H04L 45/245* (2013.01)

(58) Field of Classification Search
None
See application file for complete search history.

(56) References Cited

U.S. PATENT DOCUMENTS

| | | | | |
|---|---|---|---|---|
| 7,190,696 B1 * | 3/2007 | Manur | ..................... | H04L 45/00 370/392 |
| 8,014,278 B1 * | 9/2011 | Subramanian | ...... | H04L 12/2867 370/229 |
| 2011/0013638 A1 * | 1/2011 | Matthews | ............... | H04L 45/00 370/395.32 |
| 2011/0013639 A1 * | 1/2011 | Matthews | ............... | H04L 45/00 370/395.32 |
| 2011/0134925 A1 * | 6/2011 | Safrai | ..................... | H04L 49/35 370/395.53 |
| 2011/0164503 A1 * | 7/2011 | Yong | ....................... | H04L 69/22 370/237 |
| 2012/0134266 A1 * | 5/2012 | Roitshtein | ............. | H04L 47/125 370/230 |
| 2012/0170575 A1 * | 7/2012 | Mehra | ..................... | H04L 41/00 370/359 |
| 2012/0314581 A1 * | 12/2012 | Rajamanickam | ... | H04L 41/0826 370/238 |
| 2014/0119193 A1 * | 5/2014 | Anand | .................... | H04L 45/28 370/237 |

(Continued)

*Primary Examiner* — Kwang B Yao
*Assistant Examiner* — Juvena W Loo
(74) *Attorney, Agent, or Firm* — Haley Guiliano LLP

(57) ABSTRACT

A network with consistent hashing for packets across multi-stage lookups in the network is provided. The network members include a first network member configured to receive a packet and form a hash result from information from the packet. The first network member is further configured to look up the hash result in a first indexed table to determine a network member for routing the packet from the first network member towards a second network member of the network. The second network member is configured to receive the packet through the network and determine the hash result, and the second network member is further configured to look up the hash result in an second indexed table to determine a nexthop network member for routing the packet from the second network member, wherein the first network member and the second network member are implemented in hardware, firmware, one or more processors executing software, or combination thereof.

20 Claims, 7 Drawing Sheets

(56) References Cited

U.S. PATENT DOCUMENTS

| | | | |
|---|---|---|---|
| 2014/0119203 A1* | 5/2014 | Sundaram | H04L 43/10 370/250 |
| 2014/0254374 A1* | 9/2014 | Janakiraman | H04L 47/10 370/235 |
| 2014/0269695 A1* | 9/2014 | Tsai | H04L 45/745 370/389 |
| 2015/0188753 A1* | 7/2015 | Anumala | H04L 45/48 370/225 |
| 2015/0188760 A1* | 7/2015 | Anumala | H04L 41/083 370/254 |
| 2016/0134518 A1* | 5/2016 | Callon | H04L 45/24 370/390 |
| 2016/0134535 A1* | 5/2016 | Callon | H04L 45/48 370/390 |
| 2016/0164741 A1* | 6/2016 | Durgin | H04L 41/0836 370/255 |
| 2016/0261500 A1* | 9/2016 | Revah | H04L 45/7453 |
| 2016/0301608 A1* | 10/2016 | Natarajan | H04L 45/7453 |
| 2017/0048144 A1* | 2/2017 | Liu | H04L 47/122 |

\* cited by examiner

CONSISTENT HASHING FOR PACKETS ACROSS MULTI-STAGE LOOKUPS

BACKGROUND

Local area networks (LAN), which route network packets through network devices (e.g., switches, routers, cables, chips or integrated circuits, etc.), can be virtualized as virtual local area networks (VLAN) and extensible virtual local area networks (VXLAN). VXLAN uses encapsulation of network packets and establishes VXLAN tunnel (or tunneling) endpoints (VTEPs, also known as virtual tunneling endpoints). A specific issue arises out of multichip VXLAN routing, where ingress chips, fabric chips and egress chips in a router on some multichip systems route a network packet through device fabric. VXLAN routing is accomplished by the ingress chips performing decapsulation of the network packet, the fabric chips performing route lookup, and the egress chips performing encapsulation of the network packet. It is required that the network packet be sent through the device fabric, to the egress chip over which the packet will physically egress out of the router. Statistically, in existing systems, the network packet might or might not get to the correct egress chip at first, and might arrive at an incorrect egress chip that is not connected to and cannot get the packet to its eventual destination directly. In this instance the packet takes one or more additional hops over the device fabric, to eventually arrive at the correct egress chip, thereby increasing (e.g., doubling) the fabric utilization of the packet. It is within this context that the embodiments arise.

SUMMARY

In some embodiments, a method for routing packets in a network, performed by one or more network devices, is provided. The method includes hashing information from a packet to form a hash result, in a fabric member of a device. The method includes identifying, in a link aggregation group (LAG) data structure, based on the hash result in the fabric member, a LAG member to which to route the packet from the fabric member towards an egress member of the device. The method includes determining the hash result, in the egress member, and identifying, in an equal cost multipath (ECMP) group data structure, based on the hash result at the egress member, a nexthop to which to route the packet from the egress member.

In some embodiments, a network with consistent hashing for packets across multi-stage lookups in the network is provided. The network members include a first network member configured to receive a packet and form a hash result from information from the packet. The first network member is further configured to look up the hash result in a first indexed table to determine a network member for routing the packet from the first network member towards a second network member of the network. The second network member is configured to receive the packet through the network and determine the hash result, and the second network member is further configured to look up the hash result in an second indexed table to determine a nexthop network member for routing the packet from the second network member, wherein the first network member and the second network member are implemented in hardware, firmware, one or more processors executing software, or combination thereof.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A network device solution to the above-discussed problem uses a link aggregation group (LAG), which mirrors the equal cost multipath (ECMP) reachability of the remote virtual tunneling endpoint (VTEP). This LAG is a system-internal LAG that delivers the packet to the right egress chip in a router. The packets routed on the device fabric internal to the router use a hash value and this LAG in their next hops. The egress chips then use the same hash value to pick an ECMP member after encap (encapsulation), corresponding to the one used to pick a LAG member. The use of the same hash algorithm, hash inputs and mirrored contents of the LAG and ECMP ensures that the packet does not go back to the device fabric internal to the router/network device.

Figure 1:
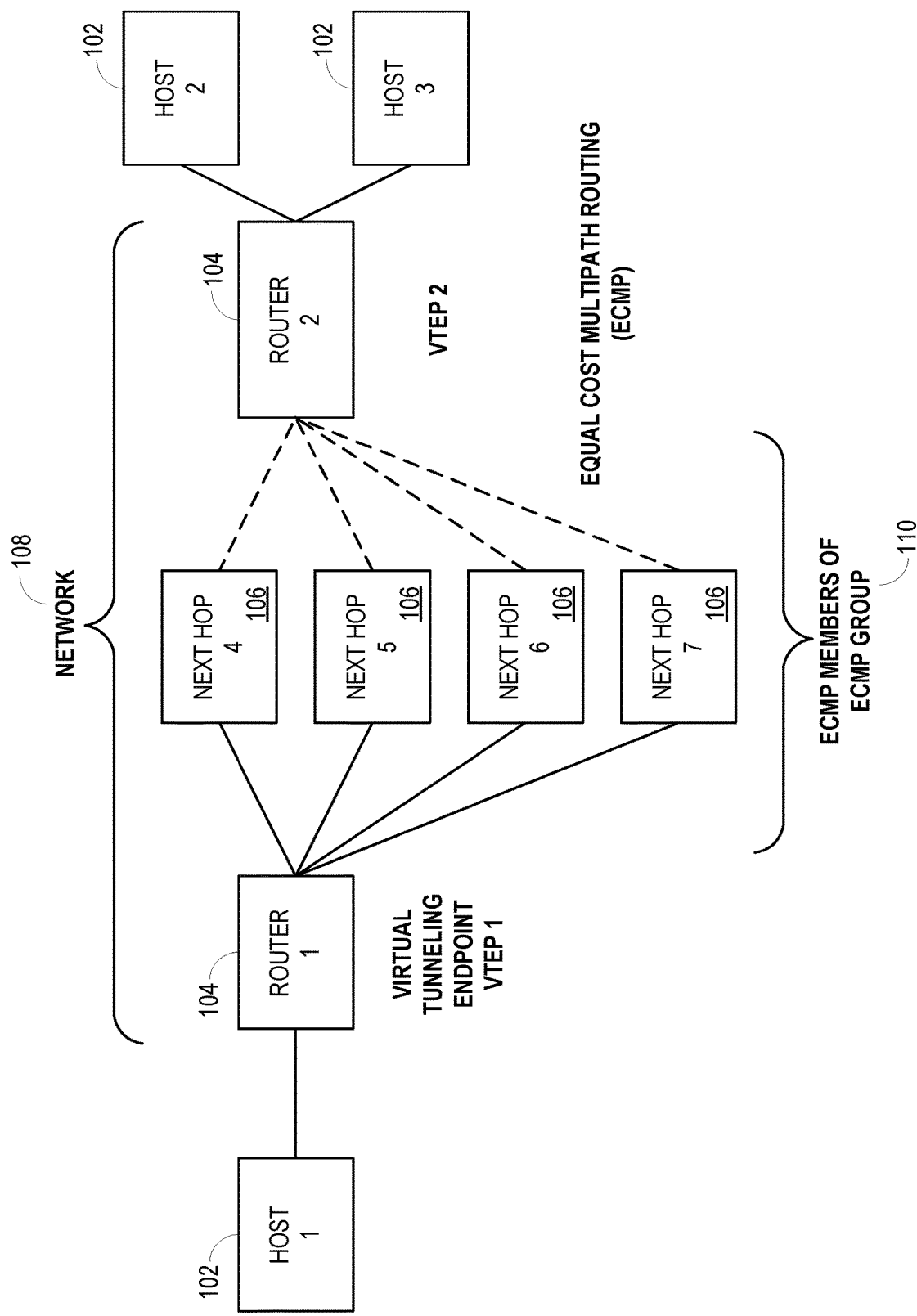
FIG. 1 is a network diagram showing equal cost multipath (ECMP) routing through a network device and identifying ECMP members of an ECMP group in accordance with some embodiments.

FIG. 1 is a network diagram showing equal cost multipath (ECMP) routing through a network 108 and identifying ECMP members of an ECMP group 110. One of the features of equal cost multipath routing is the ability to accommodate more than one path through a network 108 from one point to another, and the ECMP group 110 organizes paths of equal cost, in terms of total delay time, through the network 108. A network packet originating in one of the hosts 102, Host 1, goes to one of the routers 104, Router 1, and is routed along one of the paths in the ECMP group 110 to another router 104, Router 2, and from there to one of the hosts 102, Host 2 or Host 3 as designated in the packet header from the point of origin. The packet could travel via any one of the next hops 106 (which may be referred to as nexthop or nexthops, as is done in network industry terminology) and further members of the network 108 along one of the paths identified in the ECMP group 110. Each time the packet progresses from one member of the network 108 to another member of the network 108 that is a next hop, until the packet arrives at the destination. It should be appreciated that while the figures illustrate routers 104, the embodiments are not meant to be limiting as the router may be embodied within a network element or other network device, such as a switch, etc.

Figure 2:
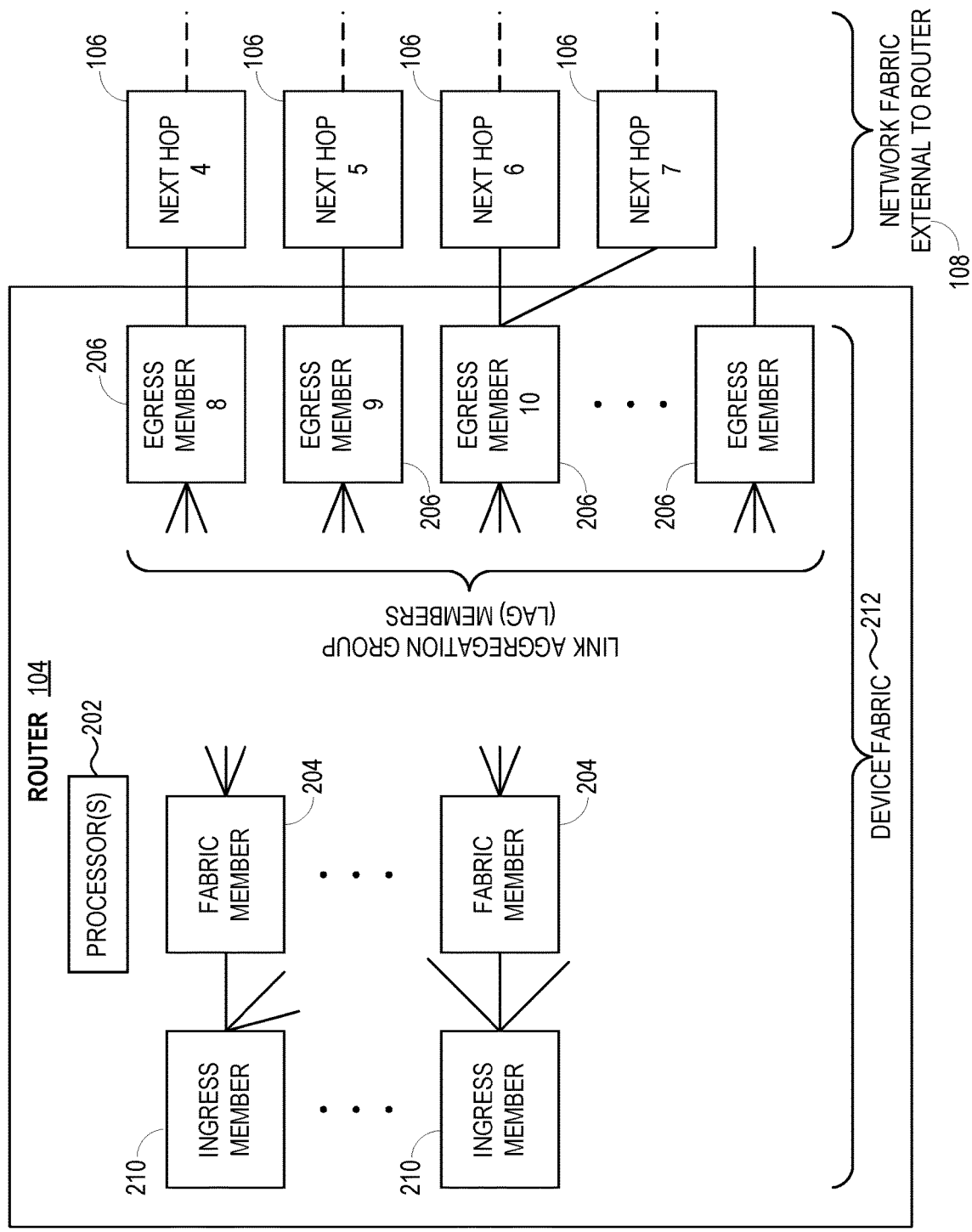
FIG. 2 is a system diagram of a router from FIG. 1, showing ingress members, fabric members and egress members, and identifying a link aggregation group (LAG) for a fabric member in accordance with some embodiments.

FIG. 2 is a system diagram of a router 104 from FIG. 1, showing ingress members 210, fabric members 204 and egress members 206, and identifying a link aggregation group (LAG) 208 and egress members 206 as members of the LAG group 208 (i.e., LAG members) for a fabric member 204. In the network diagram of FIG. 1, the router 104 of FIG. 2 is Router 1 for this example, but could also be used in further examples as Router 2, or other routers. The network packet from host 102 (see FIG. 1) arrives at the upper ingress member 210 of the router 104, is decapped (i.e., de-encapsulated) and routed or bridged to one of the fabric members 204, e.g., a fabric chip. That fabric member 204 routes the packet to one of the egress members 206, more specifically to one of the LAG members which in this embodiment are the egress members 206, also internal to the router 104. From that egress member 206, the packet is encapped (i.e., encapsulated) and routed to one of the next hops 106 in the network 108 external to the router 104, as shown in FIG. 1. Each of these ingress members 210, fabric members 204, and egress members 206 (or LAG members) can be implemented as hardware, firmware, one or more processors 202 executing software, or combinations thereof. In some embodiments, each ingress member 210, fabric member 204 and egress member 206 of the router 104 or other network device is a chip or integrated circuit, although it is readily envisioned that these could be implemented with a greater number of integrated circuits, or combined in a lesser number of integrated circuits or even a single system on chip (SOC) integrated circuit. The term routing is used herein in the general sense of directing a packet towards a destination based on a lookup table with or without any header modifications, and does not necessarily imply a specific L3 (layer three) lookup involving a header rewrite. Further members of the device fabric 212 (internal to the router 104) are indicated by the triple dots in the depiction of the router 104.

Still referring to FIG. 2, each egress member 206 of the router 104 is connected to specific next hop 106 members of the network 108 external to the router in some embodiments. This means that a specific next hop 106 is available to a specific egress member 206, and might not be available to other egress members 206. When routing a packet to a specified next hop 106 external to the router, the correct egress member 206 is the egress member 206 that is connected to that specified next hop 106. If the packet is routed to an incorrect egress member 206, the packet must then be routed from that egress member 206 to the correct ingress member 206 in order to be routed to the desired next hop 106 external to the router. In that case, the rerouting from incorrect egress member 206 to correct egress member 206 incurs reentry to the device fabric 212 of the router and one or more additional hops to get to the correct egress member 206. The embodiments described below avoid these additional/unnecessary hops.

Figure 3:
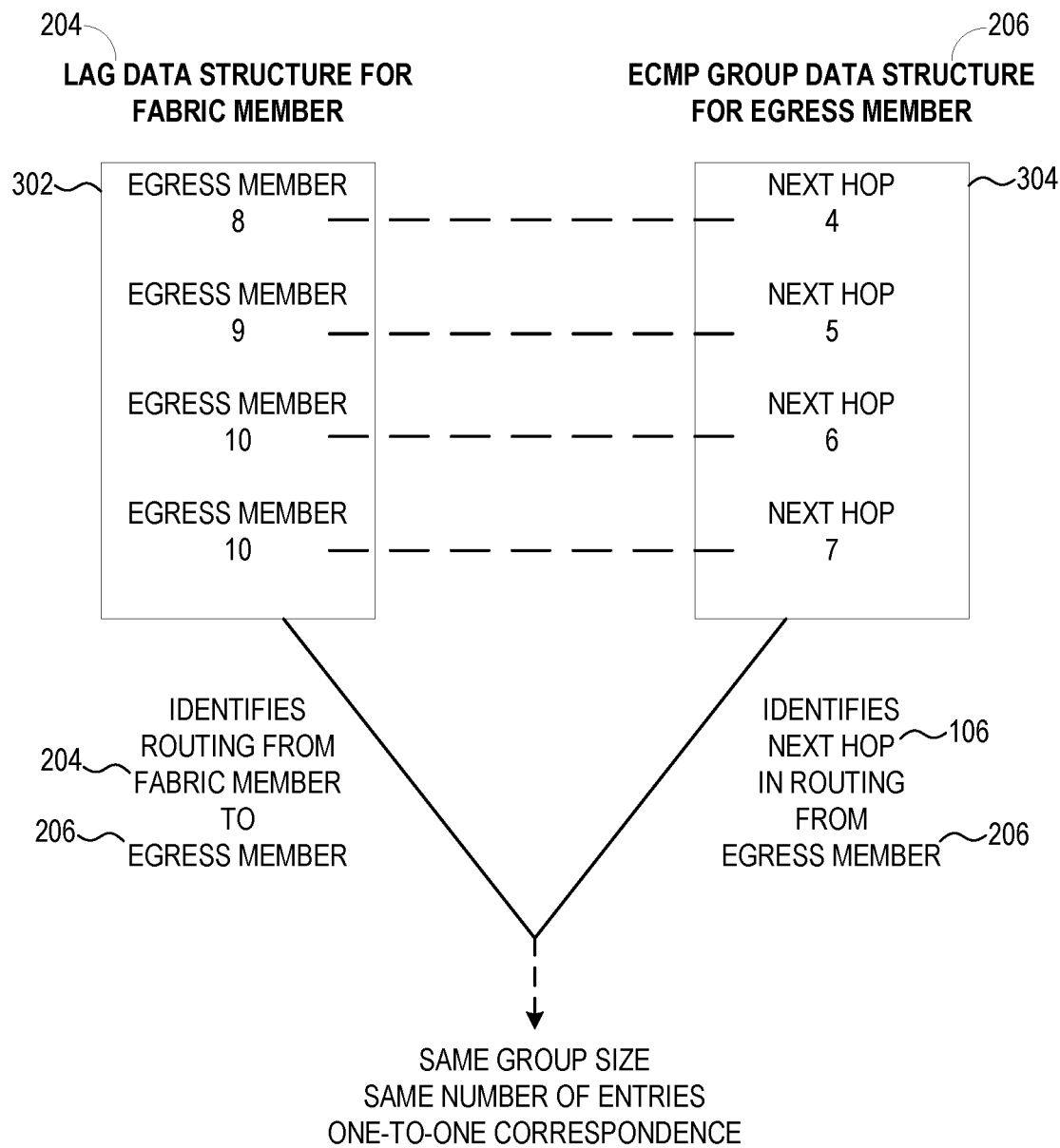
FIG. 3 depicts a LAG data structure for a fabric member and an ECMP group data structure for an egress member, as used in the router of FIG. 2 for consistent routing through the device fabric in accordance with some embodiments.

FIG. 3 depicts a LAG data structure 302 for a fabric member 204 and an ECMP group data structure 304 for an egress member 206, as used in the router 104 of FIG. 2 for consistent routing through the device fabric 212. These two data structures 204, 206 are set up and programmed into the router 104, e.g., by an administrator or by an automated process in software, as corresponding or coordinated pieces of the system, and have the same group size, i.e., same number of entries, and a one-to-one correspondence of entries to each other. That is, the group size or number of entries in the LAG data structure 302 is the same as the group size or number of entries in the ECMP group data structure 304. Each entry in the LAG data structure 302 corresponds to one and only one entry in the ECMP group data structure 304, and vice versa.

Each entry in the LAG data structure 302 for a fabric member 204 identifies an egress member 206 in the device fabric 212 internal to the router 104, for routing a packet from the fabric member 204. Each entry in the ECMP group data structure 304 for an egress member 206 identifies a next hop 106 in the network 108 external to the router, for routing a packet from the egress member 206. This pairing of corresponding entries in the two data structures 204, 206, for a link aggregation group 208 and corresponding equal cost multipath group 110, is how the choices of paths from the fabric member 204 and the egress member 206 are set up for consistent routing through the device fabric 212. Each of the fabric members 204 has an identical set up in some embodiments, with a LAG data structure 302 corresponding to the ECMP group data structure 304 in egress members 206 to which that fabric member 204 can route. Thus, no matter to which fabric member 204 the ingress member 210 initially routes the packet, the packet is routed consistently from that fabric member 204 to the correct egress member 206 for the following next hop 106 outside of the router 104. FIGS. 1-3 show examples by way of illustration, and real-world systems may have many more entries in the data structures 302, 304, and corresponding members in the device fabric 212. The data structures 302, 304 may have other information as well, and could be implemented as tables, lists, databases, etc. in memory coupled to one or more processors 202.

Figure 4:
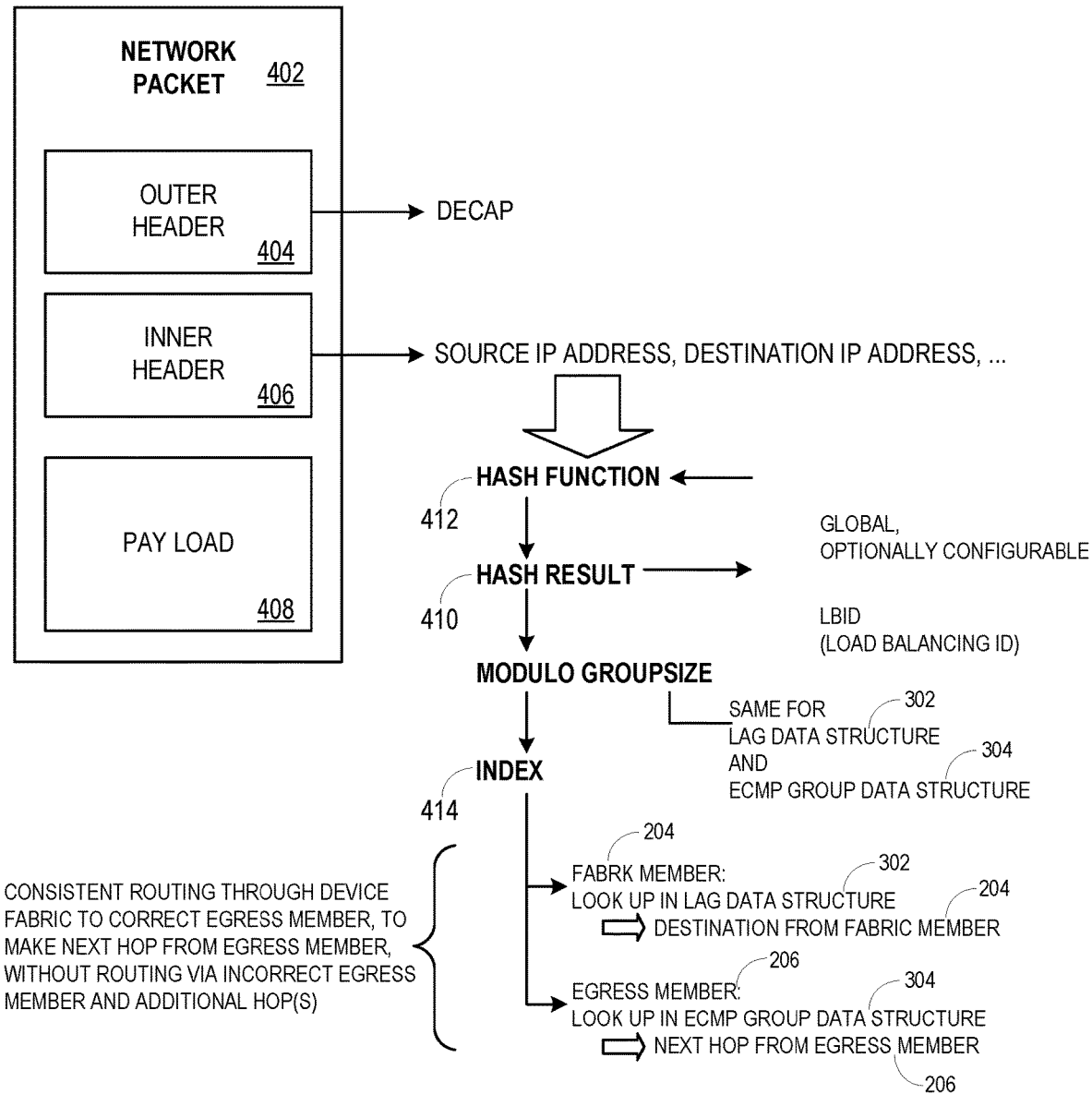
FIG. 4 is a network packet and action diagram, showing how information from the network packet is used in the fabric and egress members in the router of FIG. 2 for looking up nexthops in the device fabric in accordance with some embodiments.

FIG. 4 is a network packet 402 and action diagram, showing how information from the network packet 402 is used in the fabric members 204 and egress members 206 in the router 104 of FIG. 2 to determine the egress member 206 and nexthop 106 respectively. Typically, in a VXLAN, the packet 402 arrives at the VTEP configured router 104 with an optional outer header 404, an inner header 406 and a payload 408 (e.g., the data unrelated to header and routing information, in the packet). For example, in a VXLAN environment, the packet 402 may come from the edge unencapsulated or from the core encapsulated. The ingress member 210 (see FIG. 2) decaps the packet 402, removing the outer header 404 if present. After this, the inner header 406 and the payload 408 remain in the network packet 402, and the ingress member 210 routes the packet to one of the fabric members 204. Using the source IP (Internet protocol) address, the destination IP address and/or other information from the inner header 406 of the network packet 402, or in further embodiments other information from elsewhere in the network packet 402 (e.g., information from layer 2, layer 3 and/or layer 4, i.e., L2/L3/L4), as input to a hash function 412, the fabric member 204 produces a hash result 410. In some embodiments, the hash result is stored as a load-balancing identifier (LBID) associated with metadata of the packet.

Still referring to FIGS. 2 and 4, the fabric member 204 takes the hash result modulo the group size (which is the same for the LAG data structure 302 and the ECMP group data structure 304), to produce an index 414 for the LAG data structure 304. Using this index 414, the fabric member 204 looks up the next member (e.g., an egress member 206) to which to route, in the LAG data structure 302, and routes the packet to this egress member 206 from the fabric member 204. When the packet arrives at the egress member 206, from and as determined by the fabric member 204, the egress member 206 performs related actions. The egress member 206 obtains the same information from the packet 402 as was used by the fabric member 204, performs the same hash function and the same modulo group size operation on the hash result 410, and thus derives the same index 414 in the same way that the fabric member 204 did. Alternatively, the egress member 206 uses the hash result 410 from the fabric member 204, or the index 414, passed over in packet metadata. Further calculation or communication mechanisms for determining the same hash result 410 or the index 414 at the egress member 206, as used by the fabric member 204, are readily devised in keeping with the teachings herein. Using this same index, e.g., the hash result 410, the egress member 206 looks up the next hop 106 in the ECMP group data structure 304, and routes the packet there from the egress member 206. It should be appreciated that this next hop 106 is in the network 108 external to the router 104. In the embodiment shown, the egress member 206 encapsulates the packet 402 with routing information (e.g., in an outer header 404) prior to sending the packet 402 to the next hop 106. It should be appreciated that the routing operation may be referred to as bridging, based on L2 lookup. Thus, the combination of using the same hash algorithm and the same hash inputs, or otherwise obtaining the same hash result 410 or index 414 (e.g., via communication), and the one-to-one correspondence/same number of entries/same group size of LAG data structure 302 and ECMP group data structure 304 result in consistent routing through the device fabric 212 (e.g., the fabric chip) to the correct egress member 206 able to make the next hop 106 from the egress member 206. It should be appreciated that embodiments avoid routing to the correct egress member 206 via an incorrect egress member 206, i.e., avoid making one or more additional hops back through the device fabric 212. In some embodiments, the hash function 412 is a global hash function, used the same everywhere throughout the router 104. In some embodiments, the hash function 412 is configurable. For example, the hash function 412 could be changed periodically or if there is a problem with hash polarization affecting load-balancing. In various embodiments, other fabric members 204, e.g., chips or modules in the device fabric 212 internal to the router 104 have similar resources and perform similar actions to the fabric member 204.

Figure 5:
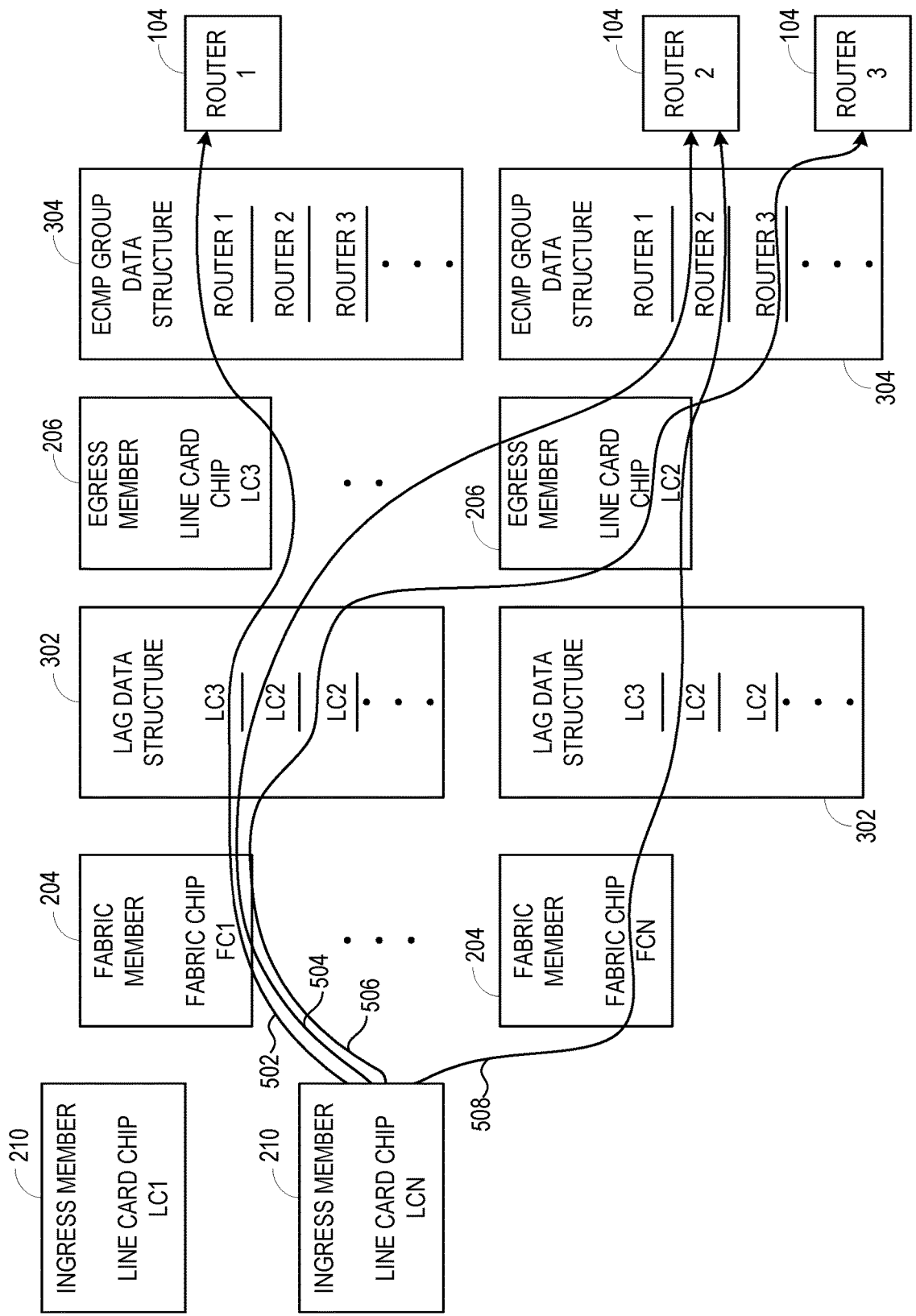
FIG. 5 is a system diagram depicting paths for network packet routing from an ingress member, through fabric members with LAG data structures and egress members with ECMP group data structures, to routers.

With reference back to FIGS. 1-4, a few examples serve to illustrate system operation and how a packet is routed consistently through the network 108. FIG. 5 shows further examples. As a first example, a packet originates at Host 1 and goes to Router 1 (see FIG. 1). The ingress member 204 in the router 104 decaps the packet and routes the packet to a fabric member 204 (see FIG. 2). The fabric member 204 looks up the second entry Egress Member 9 in the LAG data structure 302 (see FIG. 3), based on hashing the packet information modulo the group size of four (e.g., there are four entries in the LAG data structure 304) and identifying the index 414 of two (i.e., pointing to the second entry). From there, the fabric member 204 routes the packet to the Egress Member 9. The Egress Member 9 arrives at the same hash result 410, for example by performing the same hash operation on the same packet information or by using hash information provided by the fabric chip in the packet metadata, takes the modulo the same group size of four (e.g., there are four entries in the ECMP group data structure 304) and identifies the same index 414, two. Alternatively, the index itself could be passed in the packet metadata. Then the Egress Member 9 looks up the second entry Next Hop 5 in the ECMP group data structure 304 (see FIG. 3). From there, the Egress Member 9 routes the packet to Next Hop 5.

As a second example, the index 414 calculated by the fabric member 204 and the egress member 206 is three. The fabric member 204 looks up the third entry Egress Member 10 in the LAG data structure 302, and routes accordingly, and the packet gets to Egress Member 10. Egress Member 10 looks up the third entry Next Hop 6 in the ECMP group data structure 304, and routes there. As a third example, the index calculated by the fabric member 204 and the egress member 206 is four. The fabric member 204 looks up the fourth entry, Egress Member 10 in the LAG data structure 302, and routes there, and the packet gets to Egress Member 10. Egress Member 10 looks up the fourth entry in the ECMP group data structure 304, Next Hop 7, and routes there. In all of the above examples, and in further examples readily devised, the packet is routed consistently from a fabric member 204, to an egress member 206 and to a next hop 106 external to the router 104, without going to an incorrect egress member 206 and without having to take any extra hops in the network 108 internal to the router. If the same hash function had not been used, if the group sizes of the data structures 302, 304 had not been the same, if the contents of the data structures 302, 304 had not been set up with the proper one-to-one correspondence, or if the proper link aggregation group 208 had not been set up in the first place, the above described consistency would not have been achieved.

FIG. 5 is a system diagram depicting paths 502, 504, 505, 508 for network packet 402 routing from an ingress member 210, through fabric members 204 with LAG data structures 302 and egress members 206 with ECMP group data structures 304, to routers 104. This shows many of the features and actions described above with reference to FIGS. 1-4, all in one diagram. On a first path 502, the network packet 402 (see FIG. 4) is routed from the ingress member 210, in this example linecard chip LCN, to the fabric member 204, in this example fabric chip FC1. The fabric member 204 FC1 generates an index 414 (see FIG. 4) of one, looks up the first entry in the LAG data structure 302, LC3, and sends the packet 402 to the egress member 206 identified as linecard chip LC3. This egress member 206 LC3 determines the same index 414 of one, looks up the first entry in the ECMP group data structure 304, Router 1, and sends the packet 402 to the router 104 identified as Router 1.

On a second path 504, the ingress member 210 routes the network packet 402 to the fabric member 204 FC1, which generates an index 414 of two, looks up the second entry in the LAG data structure 302, LC2 and sends the network packet 402 to the egress member 206 LC2. This egress member 206 LC2 determines the same index 414 of two, looks up the second entry in the ECMP group data structure 304, Router 2, and sends the packet 402 to the router 104 Router 2.

On a third path 506, the ingress member 210 routes the network packet 402 to the fabric member 204 FC1, which generates an index 414 of three, looks up the third entry in the LAG data structure 302, LC2 and sends the network packet 402 to the egress member 206 LC2. This egress member 206 LC2 determines the same index 414 of three, looks up the third entry in the ECMP group data structure 304, Router 3, and sends the packet 402 to the router 104 Router 3.

On a fourth path 504, the ingress member 210 routes the network packet 402 to the fabric member 204 FCN, which generates an index 414 of two, looks up the second entry in the LAG data structure 302, LC2 and sends the network packet 402 to the egress member 206 LC2. This egress member 206 LC2 determines the same index 414 of two, looks up the second entry in the ECMP group data structure 304, Router 2, and sends the packet 402 to the router 104 Router 2.

The above examples show how a network packet 402 can be routed to different fabric members 204 but then to the same egress member 206 and the same router 104, or routed to one fabric member 204 and then two different egress members 206 and different routers 104. In some embodiments, different packets can be routed to the same/different fabric members 204, the same egress member 206, but different nexthops/routers 104 on the same egress member. Further examples with further paths 502 and combinations of ingress members 210, fabric members 204, egress members 206, and routers 104 or other next hops 106 are readily devised, showing both flexibility and consistency and reliability in the routing using the above described mechanisms. In further embodiments, other indexes and data structures can be used in place of the hash result 410 (i.e., hash value), the index 414, the lag data structure 302 and the ECMP group data structure 304. The system can be extended for further layers and numbers of devices, and various layers in network protocols and network structures.

Figure 6:
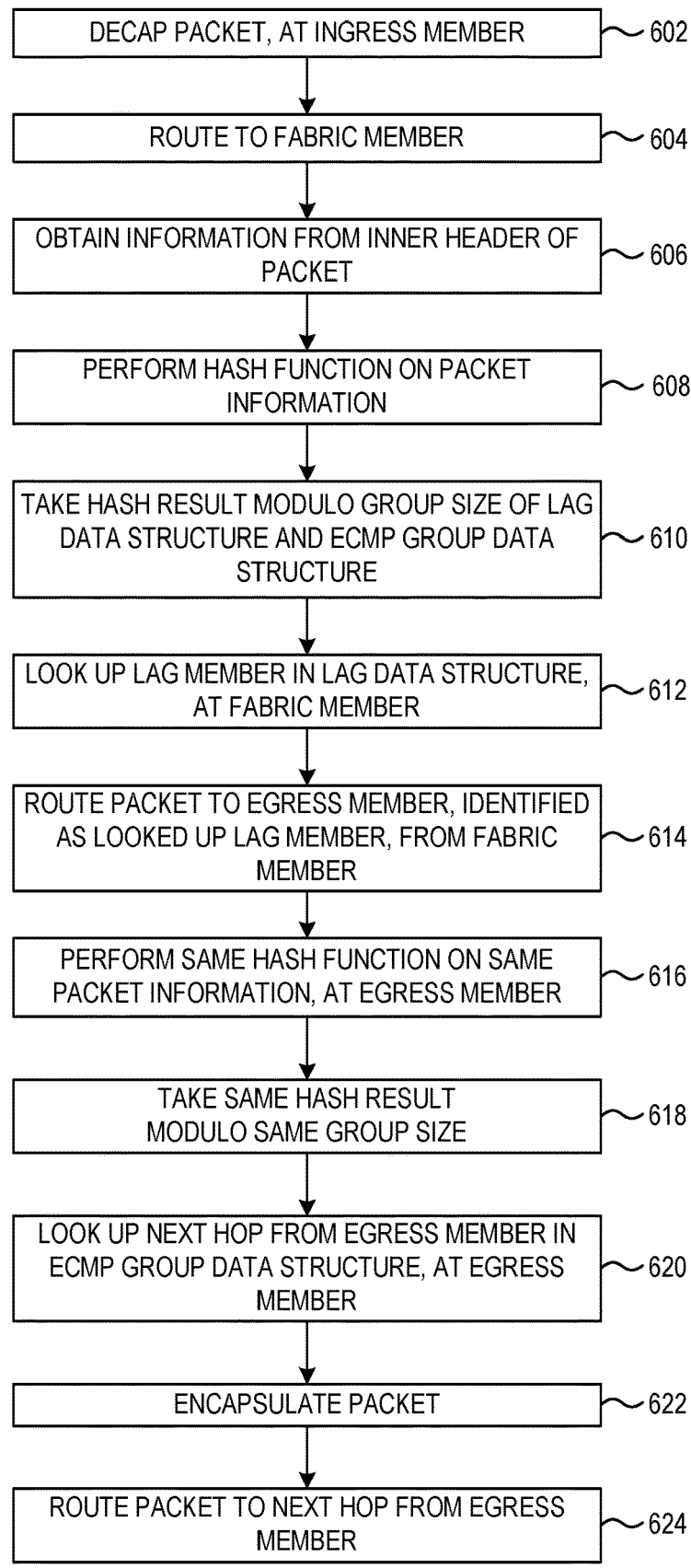
FIG. 6 is a flow diagram of a method for routing packets in a network, which can be performed by embodiments of the fabric members and egress members, and embodiments of the router of FIG. 2, using the LAG data structure and ECMP group data structure of FIG. 3 in accordance with some embodiments.

FIG. 6 is a flow diagram of a method for routing packets in a network, which can be performed by embodiments of the fabric members and egress members, and embodiments of the router of FIG. 2, using the LAG data structure and ECMP group data structure of FIG. 3. The method can be practiced by one or more processors in a network device, such as a router. In an action 602, a network packet is decapped, if it came encapsulated. For example, the outer header is removed by an ingress member, leaving the inner header and payload. In other embodiments, the decapsulation is skipped. The ingress member routes the packet to a fabric member in an action 604. The source IP address, destination IP address and/or other information from the inner header, or elsewhere in the network packet in further embodiments, is obtained in an action 606, by the fabric member. A hash function is performed by the fabric member on the packet information, in an action 608, producing a hash result. This could be a global hash function used throughout the network device, and could be configurable in some embodiments.

Still referring to FIG. 6, in an action 610, the hash result is operated on modulo the group size of the LAG data structure and the ECMP group data structure. This operation by the fabric member produces an index. The index is used by the fabric member to look up the LAG member (i.e., the egress member to which the packet will be routed from the fabric member), in the LAG data structure, in an action 612. For example, the index could be a pointer into the LAG data structure in some embodiments. In an action 614, the packet is routed by the fabric member from the fabric member to the egress member identified as the looked up LAG member. Standard routing techniques apply in some embodiments. In an action 616, the same hash function is performed on the same packet information, at the egress member. The same hash result is produced by the egress member as in operation 608. In an action 618, the same hash result is operated on modulo the same group size, by the egress member. This should produce the same index as described with reference to operation 610. Alternatively, the hash result or the index is obtained directly from information in the packet header, e.g., by extraction. In an action 620, the index is used by the egress member to look up the next hop from the egress member in the ECMP group data structure, at the egress member. For example, this same index could be a pointer into the ECMP group data structure. The packet is encapped or encapsulated, in an action 622, by the egress member. For example, an outer header is added to the packet. In some embodiments, the encapsulation is skipped. The packet is routed to the next hop from the egress member, in an action 624, according to the encapsulation, in some embodiments.

In a further embodiment, the consistent hashing does not involve a VXLAN encapsulation operation. In this case, it is an ECMP at the fabric member as well as an ECMP at the egress member. A packet comes in encapsulated, gets decapsulated at the ingress line card. The fabric chip routes this packet through an ECMP group choosing a next hop representing the right egress chip, not actually modifying the packet. The egress chip routes the packet again, arrives at the same hash as at the device fabric, and sends it out the right egress chip.

Figure 7:
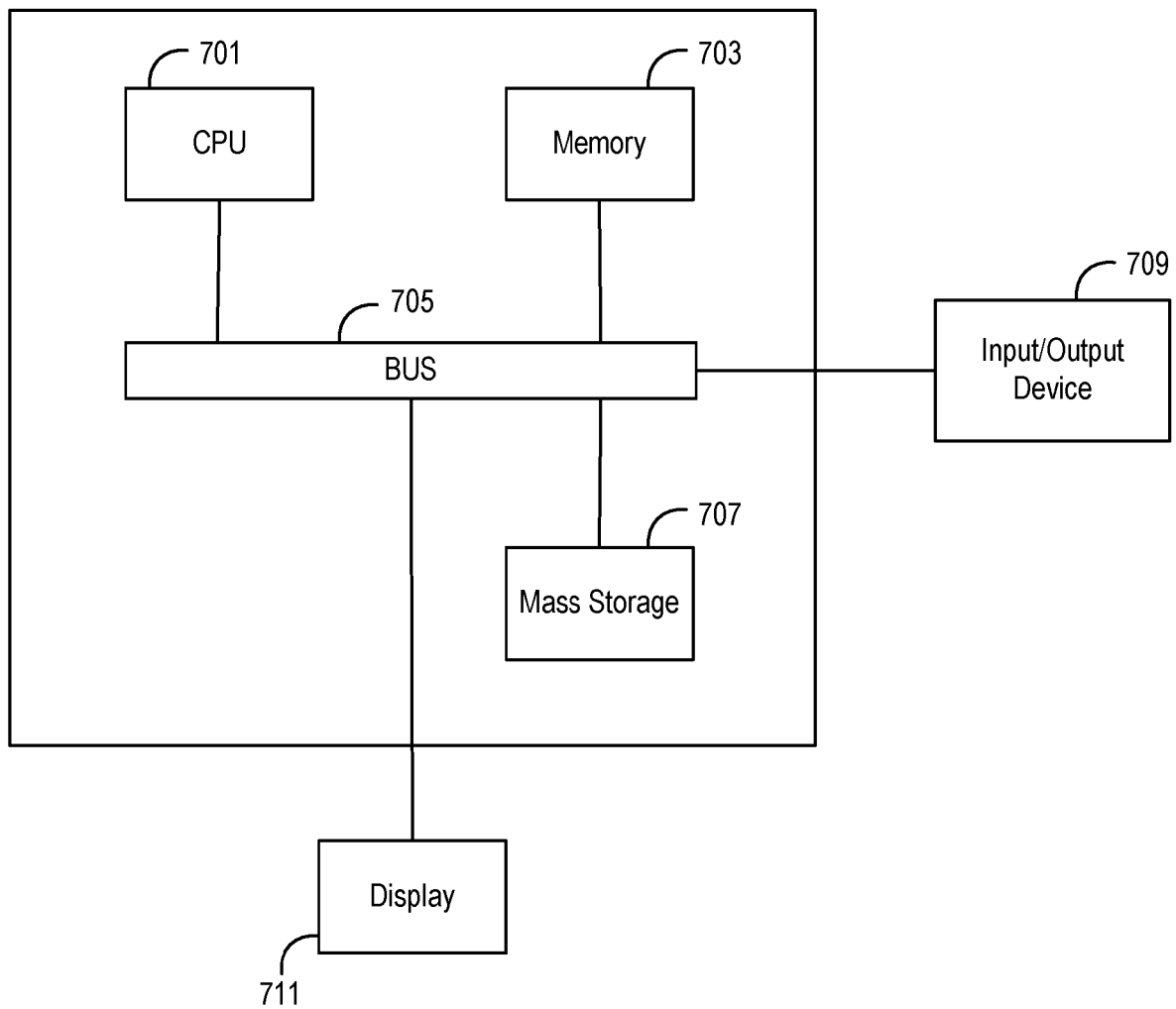
FIG. 7 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device which may implement the embodiments described herein. The computing device of FIG. 7 may be used to perform embodiments of the functionality for consistent hashing and routing of network packets in accordance with some embodiments. The computing device includes a central processing unit (CPU) 701, which is coupled through a bus 705 to a memory 703, and mass storage device 707. Mass storage device 707 represents a persistent data storage device such as a floppy disc drive or a fixed disc drive, which may be local or remote in some embodiments. The mass storage device 707 could implement a backup storage, in some embodiments. Memory 703 may include read only memory, random access memory, etc. Applications resident on the computing device may be stored on or accessed via a computer readable medium such as memory 703 or mass storage device 707 in some embodiments. Applications may also be in the form of modulated electronic signals modulated accessed via a network modem or other network interface of the computing device. It should be appreciated that CPU 701 may be embodied in a general-purpose processor, a special purpose processor, or a specially programmed logic device in some embodiments.

Display 711 is in communication with CPU 701, memory 703, and mass storage device 707, through bus 705. Display 711 is configured to display any visualization tools or reports associated with the system described herein. Input/output device 709 is coupled to bus 705 in order to communicate information in command selections to CPU 701. It should be appreciated that data to and from external devices may be communicated through the input/output device 709. CPU 701 can be defined to execute the functionality described herein to enable the functionality described with reference to FIGS. 1-6. The code embodying this functionality may be stored within memory 703 or mass storage device 707 for execution by a processor such as CPU 701 in some embodiments. The operating system on the computing device may be iOS™, MS-WINDOWS™, OS/2™, UNIX™, LINUX™, or other known operating systems. It should be appreciated that the embodiments described herein may also be integrated with a virtualized computing system implemented with physical computing resources. Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to"

perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for routing packets in a network, performed by one or more network devices, comprising:
   hashing information from a packet to form a hash result, in a fabric member of a network device;
   identifying, in a link aggregation group (LAG) data structure, based on the hash result in the fabric member, an egress member of the network device to which to route the packet from the fabric member;
   determining the hash result, at the egress member; and
   identifying, in an equal cost multipath (ECMP) group data structure, based on the hash result at the egress member, a next hop to which to route the packet from the egress member.

2. The method of claim 1, further comprising:
   routing the packet from the fabric member to the egress member, and from the egress member to an ECMP member next hop.

3. The method of claim 1, wherein the LAG data structure and the ECMP group data structure have a one-to-one correspondence between entries in the LAG data structure and entries in the ECMP data structure.

4. The method of claim 1, wherein the LAG data structure and the ECMP group data structure have a same number of members, ensuring consistency of routing the packet based on the hash result and the same hash result.

5. The method of claim 1, wherein a correspondence between members in the LAG data structure and next hops in the ECMP group data structure, and use of the hash result in the fabric member and the hash result in the egress member, result in routing the packet to a correct egress member and a correct next hop ECMP member without routing the packet via an incorrect egress member and avoiding additional hops through the device fabric.

6. The method of claim 1, further comprising:
   decapping the packet at a network ingress member, wherein the information from the packet comprises information from an inner header of the packet that remains after the decapping removes an outer header of the packet.

7. The method of claim 1, wherein each of the hashing the information from the packet in the fabric member, and the hashing the information in the egress member, comprise:
   hashing information from at least one of a level two header, a level three header or a level four header of the packet.

8. A tangible, non-transitory, computer-readable media having instructions thereupon which, when executed by at least one processor, cause the at least one processor to perform a method comprising:
   receiving a packet at a fabric member of a network device;
   forming a hash result based on information from the packet, at the fabric member;
   determining, at the fabric member, an egress member to which to route the packet from the fabric member based on the hash result at the fabric member and a LAG data structure;
   determining the hash result, at the egress member; and
   determining a next hop equal cost multipath (ECMP) member to which to route the packet from the egress member, based on the hash result in the egress member and an ECMP group data structure having a same group size as the LAG data structure.

9. The computer-readable media of claim 8, wherein there is a one-to-one correspondence between entries in the LAG data structure and entries in the ECMP group data structure.

10. The computer-readable media of claim 8, wherein the method further comprises:
    configuring a global hash function, wherein each of forming the hash result at the fabric member and forming the hash result at the egress member utilize the global hash function.

11. The computer-readable media of claim 8, wherein the determining the LAG member at the fabric member results in routing the packet to a correct egress member but not via an incorrect egress member and incurring one or more additional hops through the device fabric.

12. The computer-readable media of claim 8, wherein the method further comprises:
    decapping the packet at the ingress member to remove an outer header and leave an inner header of the packet, with the information from the packet, for forming the hash result, in the inner header.

13. The computer-readable media of claim 8, wherein the forming the hash result at the fabric member and the forming the hash result at the egress member each comprise hashing information from one or more headers of the packet.

14. A network device with consistent hashing for packets across multi-stage lookups in the network device, comprising:
    a first network member of the network device, wherein the first network member is configured to receive a packet and form a hash result from information from the packet;
    the first network member further configured to look up the hash result in a first indexed table to determine a network member for routing the packet from the first network member towards a second network member of the network device;
    the second network member, configured to receive the packet and determine the hash result; and
    the second network member, further configured to look up the hash result in a second indexed table to determine a next hop network member for routing the packet from the second network member, wherein the first network member and the second network member are implemented in hardware, firmware, one or more processors executing software, or combination thereof.

15. The plurality of network members of claim 14, further comprising:
    the first network member and the second network member configured to have a global hash function that is configurable, for forming the hash result in the first network member and forming the hash result in the second network member.

16. The plurality of network members of claim 14, wherein entries in the first indexed table have a one-to-one correspondence with entries in the second indexed table.

17. The plurality of network members of claim 14, wherein:
    the first indexed table and the second indexed table have a same group size;
    the first network member configured to look up the hash result in the first indexed table comprises the first network member configured to look up the hash result, modulo the same group size, in the first indexed table; and
    the second network member configured to look up the hash result in the second indexed table comprises the second network member configured to look up the hash result, modulo the same group size, in the second indexed table.

18. The plurality of network members of claim 14, wherein the routing the packet towards the second network member results in routing the packet to a correct second network member without earlier routing the packet to an incorrect second network member and undergoing one or more additional hops in the network.

19. The plurality of network members of claim 14, wherein the first indexed table is an ECMP group data structure.

20. The plurality of network members of claim 14, wherein the information from the packet comprises at least a source IP (Internet protocol) address and a destination IP address of the packet.

\* \* \* \* \*